UNITED STATES PATENT OFFICE.

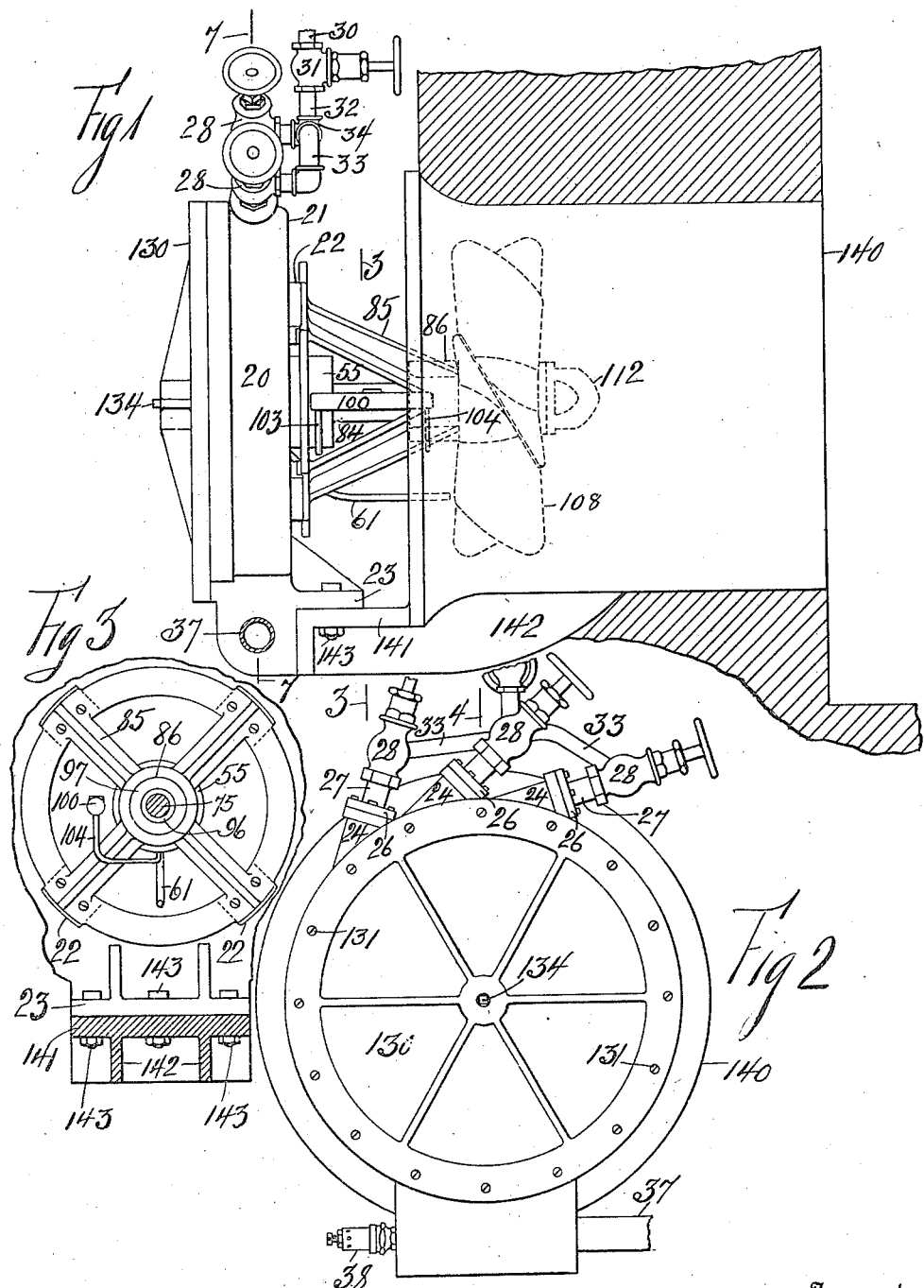

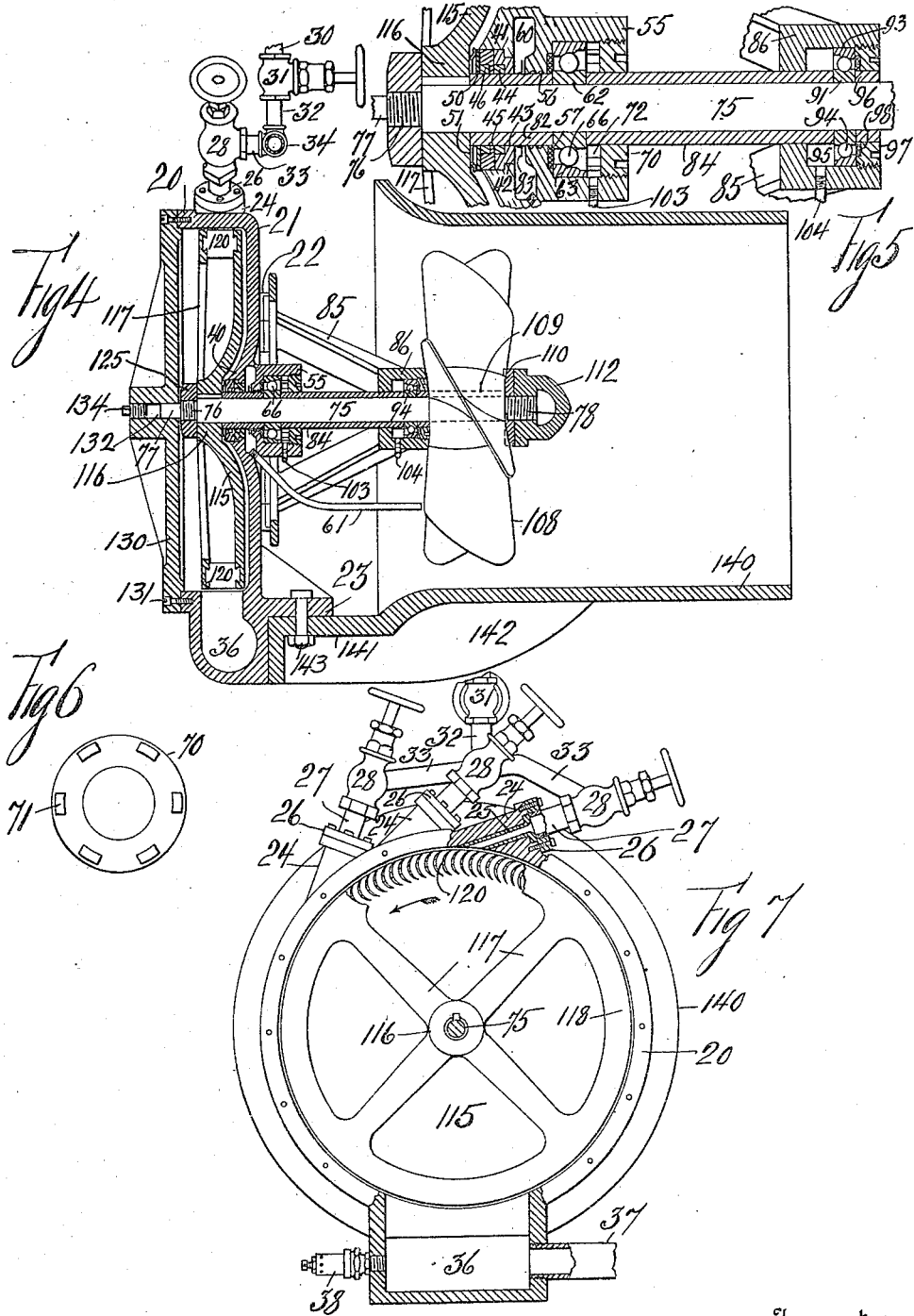

CHARLES T. COE, OF KEARNEY, NEW JERSEY.

TURBINE FAN-BLOWER.

1,268,095.  Specification of Letters Patent.  Patented June 4, 1918.

Application filed June 22, 1914. Serial No. 846,604.

*To all whom it may concern:*

Be it known that I, CHARLES T. COE, a citizen of the United States, and a resident of Kearney, in the county of Hudson and State of New Jersey, have invented certain new and useful Improvements in Turbine Fan-Blowers, of which the following is a specification.

This invention relates to a turbine fan blower.

In the drawings Figure 1 shows a side elevation of the invention connected to the ash pit of a furnace, Fig. 2 is a left hand end view of the apparatus shown in Fig. 1; Fig. 3 is a partial right hand end view and section of Fig. 1, on the line 3, 3, Fig. 4 shows a section of Fig. 2 on the line 4, 4 with some of the parts in elevation; Fig. 5 represents a partial enlarged view of a portion of Fig. 4; Fig. 6 is an elevation of a detail, and Fig. 7 represents a left hand view with a portion removed and, a partial section of Fig. 1 on the line 7, 7.

A casing is represented at 20 with the rear wall 21, having extending therefrom the lugs 22 and the flange 23. The casing has formed therewith nozzle supports 24 the axes of which are tangential to a circle passing through the middle portion of the blades to be described.

Nozzles 25 are located in the supports 24. Caps 26 are bolted to the supports 24 and carry the nipples 27 with the valves 28.

A fluid inlet pipe 30, (in this instance for steam) has connected thereto the main stop valve 31. A pipe 32 extends from the valve 31, and branch piping 33 is connected to the pipe 32 by means of the fitting 34. The piping 33 extends to the valves 28.

An exhaust cavity 36 is formed with the casing 20, and has leading therefrom the exhaust pipe 37. A safety valve 38 is also connected to the cavity 36.

The rear wall 21 of the casing 20 is depressed at its central portion toward its front face as indicated at 40 to form a stuffing box 41. The said stuffing box has an axial shouldered opening 42. A shouldered bushing 43 is located in the opening 42 and carries the spring packing ring 44. A second shouldered bushing 45 bears against the bushing 43 and ring 44. A spring packing ring 46 is carried in the bushing 45. An annular cover plate 50 bears against the bushing 45 and the ring 46. A spring 51 is shown bearing against the cover plate 50.

A threaded sleeve 55, having the packing grooves 56 is formed with the rear wall 21 to form a journal bearing adjacent thereto. The sleeve 55 is axially in line with the axis of the casing 20, and is shouldered for the disk of packing 57. An exhaust or vacuum chamber 60 is formed between the rear wall 21 and the sleeve 55, and has extending therefrom the drain pipe 61, the outer end of which extends into a duct to be described. A ball bearing cage is located in the sleeve 55 and comprises the inner ring 62 grooved on its outer circumferential surface and the outer ring 63 grooved on its inner circumferential surface. Ball bearings 66 are supported in said cage. A nut 70 with the projecting lugs 71 is in threaded engagement with the sleeve 55, the lugs 71 bearing against the outer ring 63. The nut 70 forms an oil chamber 72 with the ball bearing cage.

In the axial center of the casing 20 is located the shaft 75, having at one end the threaded shouldered portion 76. A shank 77 extends from the portion 76. The other end of the said shaft is threaded as indicated at 78. A sleeve 82 fits the shaft 75 and forms a bearing for the spring packing rings 44 and 46 with their appurtenances, and one of its ends bears against the inner ring 62. A deflector 83 fastened to the sleeve 82 extends into the chamber 60. An elongated sleeve 84 fits the shaft 75 with one end bearing against the other end of the ring 62.

A bracket 85 is fastened to the lugs 22, and has formed therewith the threaded sleeve 86 for an outer journal bearing, one end of which latter fits over the elongated sleeve 84. A ball bearing cage is located in the sleeve 86, and comprises the inner ring 91 grooved on its outer circumferential surface and the outer ring 93 grooved on its inner circumferential surface. Ball bearings 94 are supported in said cage. An oil chamber 95 is formed between the sleeve 86 and the ball bearing cage. The elongated sleeve 84 bears against one end of the ring 91. A short sleeve 96 fits the shaft 75 and has one end bearing against the other end of the ring 91. A nut 97 is in threaded engagement with the sleeve 86, and bears against the outer ring 93. The nut 97 is shouldered for the disk of packing 98.

An oil reservoir 100 has extending therefrom the pipes 103 and 104, which respectively lead to the chambers 61 and 95.

A fan wheel 108 is fastened to the shaft 75 by the key 109. The short sleeve 96 bears against one end of the hub of the fan wheel 108, and the washer 110 is located between the hub of the fan wheel 108 and a nut 112, which is in threaded engagement with the threaded end 78 of the shaft 75.

An impeller or turbine wheel having the curved disk wall 115 with the hub 116 at one side, and the spokes 117 with the rim 118 opposite thereto is keyed to the shaft 75. Between the rim 118 and the disk wall 115 are secured the curved double dovetailed blades 120. A nut 125 engages the threaded portion 76 of the shaft 75, and bears against the hub 116 of the impeller.

A bonnet 130 is fastened to the casing 20 by means of the screws 131. The bonnet 130 has an opening 132 at its center and has journaled therein the shouldered portion 77 of the shaft 75. The outer end of the opening 132 is closed by the plug 134.

The nuts 112 and 125 tighten all the elements on the shaft 75 located between them.

Axially in line with axis of the shaft 75 is the air duct 140 that has formed therewith the flange 141 and the strengthening ribs 142. Bolts 143 connect the flanges 23 and 141. The duct 140 leads preferably to the ash pit of a furnace to enhance the draft.

To use the turbine fan blower, the operator turns the valve 31 to its open position. The driving or propelling fluid then flows from the pipe 30 and passes through the valve 31, pipe 32, branch piping 33, valves 28, nipples 27 to be discharged from the nozzles 25. The jets of the fluid from said nozzles strike the curved blades 120, and thereby the impeller is turned in the direction indicated by the arrow.

The propelling fluid is deposited in the exhaust cavity 36 from which it is conducted by the exhaust pipe 37. The fan wheel 108 forces air through the duct 140 into the ash pit of the furnace, or for any other purpose to which it is applicable.

The oil reservoir 100 is filled with a lubricant which is conducted through the pipes 103, 104 to the roller bearings 66 and 94 to lubricate the latter. The pipe 61 discharges any leakage of the driving fluid that passes through the stuffing box 41, and enters into the exhaust chamber 60. The flow of air in the duct 140 causes a suction effect in the pipe 61 to draw any fluid from the latter.

Having described my invention what I desire to secure by Letters Patent and claim is:

1. In an apparatus, the combination of a casing for a turbine, a stuffing box in said casing, a vacuum chamber coacting with said stuffing box, a shaft for the turbine extending through said stuffing box and a fan wheel connected to the shaft coacting with said vacuum chamber.

2. In an apparatus the combination of a casing for a turbine, a stuffing box formed in the wall of the casing, a journal bearing extending from said wall and forming a vacuum chamber with said stuffing box, a shaft for the turbine extending through said stuffing box and means to create a suction effect in said vacuum chamber.

3. In an apparatus of the character described, the combination of a casing for a turbine, a stuffing box formed in the wall of the casing, a journal bearing extending from said wall forming an exhaust chamber with said stuffing box, a shaft for the turbine journaled in said bearing and extending through said stuffing box, a duct adjacent to said casing, a fan wheel in said duct fastened to the shaft and a drain pipe extending from said exhaust chamber with its outer end adjacent to said fan wheel.

4. In an apparatus of the character described, the combination of a turbine, a casing for the turbine, with an opening in the wall thereof, a journal bearing formed with said wall, a bracket having a journal bearing bolted to said wall, a shaft journaled in said bearings, a fan on one end of said shaft, and an impeller on the other end of said shaft within the casing, and means to turn said impeller.

5. In an apparatus of the character described, the combination of a turbine, a casing having an exhaust cavity for said apparatus, an opening in the rear wall of said casing, a journal bearing formed with said casing, a bracket extending from said wall, a journal bearing in said bracket, a shaft journaled in said bearings, a fan wheel fastened to one end of said shaft, an impeller fastened to the other end of said shaft, nozzles in the casing for a driving fluid to turn the impeller thereby causing said fan wheel to turn, and a discharge pipe connected to said exhaust cavity.

6. In an apparatus of the character described, the combination of a turbine, a casing for the turbine, a journal bearing formed with said casing, an exhaust chamber between said casing and said bearing, a bracket extending from said casing, a bearing in said bracket, ball bearings in said bearings, a shaft journaled in said bearings, a fan wheel on said shaft, a pipe extending from said chamber with its outer end adjacent the said fan wheel, and means to turn said fan wheel.

7. In an apparatus of the character described, the combination of a turbine, a casing for the turbine having a rear wall, a bonnet for the front of the casing, a pair of journal bearings for the apparatus, ball bearings in said bearings, a shaft journaled in said bearings, means to lubricate the said ball bearings, an impeller on one end of said shaft and located in said casing, nozzles in said apparatus, means to force a fluid through said nozzles and thereby rotate said impeller, an exhaust cavity in said casing to discharge the fluid from the apparatus, a duct for the apparatus and a fan wheel on the shaft located in said duct the said fan wheel revolving with the rotations of said impeller.

8. In an apparatus of the character described, the combination of a casing for a turbine, a journal bearing formed with said casing, a bracket fastened to the wall of the casing, a bearing formed in said bracket, a shaft journaled in the bearings, a fan wheel on one end of said shaft, an impeller on the other end of said shaft having a disk and a rim with spokes and curved blades secured between said rim and disk.

9. In an apparatus of the character described the combination of a casing for a turbine, a shaft for the turbine extending through the casing, a chamber leading to the opening for the shaft in said casing, a pipe with one end connected to said chamber and a fan wheel at the other end of said pipe to remove leakage from the opening in said casing and from said chamber.

Signed at the borough of Manhattan in the county of New York and State of New York this 17th day of June A. D. 1914.

CHARLES T. COE.

Witnesses:
A. A. DE BONNEVILLE,
JOHN JESSICH.

Copies of this patent may be obtained for five cents each, by addressing the "Commissioner of Patents, Washington, D. C."